(12) United States Patent
Menge et al.

(10) Patent No.: US 8,399,843 B2
(45) Date of Patent: Mar. 19, 2013

(54) SCINTILLATION ARRAY METHOD AND APPARATUS

(75) Inventors: Peter R. Menge, Chagrin Falls, OH (US); Vladimir Solovyev, Mayfield Heights, OH (US); Renee Gaspar, Middlefield, OH (US); Brian Bacon, Bristolville, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 462 days.

(21) Appl. No.: 12/640,536

(22) Filed: Dec. 17, 2009

(65) Prior Publication Data
US 2010/0148074 A1    Jun. 17, 2010

Related U.S. Application Data

(60) Provisional application No. 61/138,334, filed on Dec. 17, 2008.

(51) Int. Cl.
*G01T 1/20* (2006.01)
(52) U.S. Cl. .................................. 250/367; 250/370.11
(58) Field of Classification Search .................. 250/367, 250/368, 369, 361 R, 362, 370.11, 370.09
See application file for complete search history.

(56) References Cited

U.S. PATENT DOCUMENTS

| | | | |
|---|---|---|---|
| 4,720,426 A | 1/1988 | Englert et al. | |
| 5,378,894 A | 1/1995 | Akai | |
| 5,410,791 A | 5/1995 | Wirth et al. | |
| 5,869,836 A | 2/1999 | Linden et al. | |
| 6,222,192 B1 | 4/2001 | Sekela et al. | |
| 6,359,282 B1 | 3/2002 | Sekela | |
| 6,362,479 B1 | 3/2002 | Andreaco et al. | |
| 6,749,761 B1 | 6/2004 | Andreaco et al. | |
| 6,881,960 B2 | 4/2005 | Schreiner et al. | |
| 6,909,097 B2 | 6/2005 | Schreiner et al. | |
| 7,054,408 B2 | 5/2006 | Jiang et al. | |
| 7,102,136 B2 | 9/2006 | Fontbonne | |
| 7,138,633 B1 | 11/2006 | Rozsa et al. | |
| 7,927,393 B2 | 4/2011 | Sanami | |
| 2002/0190214 A1 | 12/2002 | Wieczorek et al. | |
| 2004/0232342 A1* | 11/2004 | Aykac et al. | .................. 250/367 |
| 2007/0007460 A1 | 1/2007 | Hochstetler et al. | |
| 2009/0065700 A1 | 3/2009 | Menge et al. | |
| 2009/0236534 A1 | 9/2009 | Selfe et al. | |

(Continued)

FOREIGN PATENT DOCUMENTS

| | | |
|---|---|---|
| JP | 2002311142 A | 10/2002 |
| WO | 2006064393 A2 | 6/2006 |

(Continued)

OTHER PUBLICATIONS

Search Report and Written Opinion of PCT/US2009/068476, mailed Jul. 30, 2010.

(Continued)

*Primary Examiner* — Mark R Gaworecki
(74) *Attorney, Agent, or Firm* — Abel Law Group, LLP; Robert T. Conway

(57) ABSTRACT

In one aspect a scintillation array includes a transparent material between portions of adjacent scintillation pixels. The transparent material can allow light to pass from one scintillation pixel to an adjacent scintillation pixel. The resulting image provides information regarding the depth at which a scintillation event occurs. Another aspect regards a scintillation array that includes reflector strips separating portions of adjacent scintillation pixels. Other spaces between portions of scintillation pixels need not include reflector strips and may be filled with other reflective material.

18 Claims, 7 Drawing Sheets

U.S. PATENT DOCUMENTS

| | | | |
|---|---|---|---|
| 2009/0261262 A1 | 10/2009 | Hunt | |
| 2009/0294683 A1 | 12/2009 | Perna | |
| 2010/0127178 A1* | 5/2010 | Laurence et al. | 250/363.04 |
| 2010/0155610 A1 | 6/2010 | Menge et al. | |

FOREIGN PATENT DOCUMENTS

| | | |
|---|---|---|
| WO | 2008010339 A1 | 1/2008 |
| WO | 2010075384 A2 | 7/2010 |
| WO | 2010078034 A2 | 7/2010 |

OTHER PUBLICATIONS

U.S. Appl. No. 12/644,551, filed Dec. 22, 2009 with Preliminary Amendment, 27 pages.

Takacs, G.J. et al. "Design and Stimulation of Continuous Scintillator with Pixellated Photodetector" IEEE Transactions on Nuclear Science, vol. 48, No. 4, Aug. 2001, 7 pages.

U.S. Appl. No. 12/644,551, filed Dec. 22, 2009, Inventors: Peter R. Menge et al., 30 pages.

International Search Report for PCT/US2009/069193 dated Aug. 13 2010, 2 pgs.

"Vikuiti Enhanced Specular Reflector (ESR)," Vikuiti Display Enhancement, Application Guidelines, 3M Innovation, Electronic Display Lighting Optical Systems Division, <http://www.3M.com/Vikuiti>, 2003, 4 pages.

"Vikuiti Enhanced Specular Reflector (ESR): A reflector for a brighter, more efficient display," Vikuiti Display Enhancement, Reflector, 3M Innovation, Electronic Display Lighting Optical Systems Division, <http://www.3M.com/Vikuiti>, 2002, 2 pages.

"Scintillation Products: Scintillation Crystal Arrays and Assemblies," Saint-Gobain Crystals, BICRON, crismatec, <http://www.detectors.saint-gobain.com/uploadedFiles/SGdetectors/Documents/Brochures/Arrays-Brochure.pdf>, 2004, 8 pages.

"ChemBlink: Online Database of Chemicals from Around the World," <http://www.chemblink.com/products/24938-04-3.htm>, 2008, printed Aug. 21, 2008, 1 page.

"DuPont Teijin Films: Datasheet," <http://www.dupontteijinfilms.com/FilmEnterprise/Datasheet.asp?Result=Print&ID=739&Version=US>, printed Oct. 12, 2012, 2 pages.

"DuPont Teijin Films: Material Safety Data Sheet," printed Aug. 2, 2007, 9 pages.

"3M: Material Safety Data Sheet," Vikuiti(TM) Enhanced Specular reflector Film with Adhesive (ESR-A), <www.3M.com>, dated Oct. 10, 2008, 6 pages.

"Melinex 339 Polyester Film," Melinex 339, The Pilcher Hamilton Corporation, <http://www.pilcherhamilton.com/products/mowpf/mowpf_011_Dupont_Mel_339.html>, printed Aug. 21, 2008, 1 page.

"Melinex—PET Film—Teijin DuPont Films," <http://www.teijindupontfilms.jp/english/product/pet_me.html>, printed Oct. 12, 2012, 2 pages.

* cited by examiner

SCINTILLATION ARRAY METHOD AND APPARATUS

RELATED APPLICATION

This application claims benefit of U.S. Provisional Patent Application Ser. No. 61/138,334 titled "SCINTILLATION ARRAY METHOD AND APPARATUS" filed Dec. 17, 2008, the contents of which are hereby incorporated by reference herein.

TECHNICAL FIELD

The present disclosure relates to scintillation detectors and, more particularly, to multi-pixel scintillation arrays.

BACKGROUND INFORMATION

Scintillation detectors are generally used to detect high energy emissions such as high energy photons, electrons or alpha particles that are not easily detected by conventional photodetectors. A scintillator, or scintillation crystal, absorbs high energy emissions and converts the energy to a light pulse. The light may be converted to electrons (i.e., an electron current) with a photodetector such as a photodiode, charge coupled detector (CCD) or photomultiplier tube. Scintillation detectors may be used in various industries and applications including medical (e.g., to produce images of internal organs), geophysical (e.g., to measure radioactivity of the earth), inspection (e.g., non-destructive, non-invasive testing), research (e.g., to measure the energy of photons and particles), and health physics (e.g., to monitor radiation in the environment as it affects humans).

Scintillation detectors typically include either a single large crystal or a large number of small crystals arranged in an array. Many scanning instruments include scintillation detectors that comprise pixellated arrays of scintillation crystals. Arrays can consist of many scintillation pixels that can be arranged in rows and columns. Pixels may be positioned parallel to each other and may be retained in position with an adhesive such as an epoxy. The array may be positioned in an imaging device so that one end of the array (high energy end) receives excitatory energy and the opposed end (light emitting end) transmits resultant visible light to a photodetector. The depth of the array from the high energy end to the light emitting end is typically referred to as the x-ray depth. Light exiting the emitting exit end can be correlated to a specific scintillation event in a specific pixel, and this light can be used to construct a pattern of excitatory energy impacting the high energy end of the array.

SUMMARY

The subject matter of this application may involve, in some cases, interrelated products, alternative solutions to a particular problem, and/or a plurality of different uses of a single system or article.

In one aspect, a scintillation array is provided, the scintillation array comprising a plurality of scintillation pixels forming an array, the array having a depth, a high energy end and a light exit end, and a light reflective material positioned between at least some pairs of adjacent pixels along less than the full length of the adjacent pixels.

In another aspect, a method of making a scintillation array is provided, the method comprising arranging a plurality of scintillation pixels into an array, placing a reflective material between adjacent pixels at a first end of the array, and retaining transparency between adjacent pixels at a second end of the array.

In another aspect, a method of detecting the position of a scintillation event is provided, the method comprising irradiating an array of scintillation pixels with excitatory energy, the array comprising a first portion at a first end of the array and a second portion at a second end of the array, forming visible light within a first pixel as a result of a scintillation event, conducting at least 60% of the visible light formed in the first pixel within the first portion of the array to a photo detector associated with the first pixel, and transmitting at least 45% of the visible light formed in the first pixel within the second portion of the array to a photo detector that is not associated with the first pixel, detecting a light output pattern from the array, and determining the position of the scintillation event by analyzing the light output pattern.

In another aspect, a scintillation array is provided, the array comprising a matrix of scintillating pixels arranged in rows and columns, the matrix having a depth from a first end to a second end, a first series of reflective strips, the strips having a first height less than the depth of the matrix, the strips separating the rows of the matrix, and a second series of reflective strips having a second height less than the depth of the matrix, the strips separating the columns of the matrix.

In another aspect, a method of making a scintillation array is provided, the method comprising placing a first plurality of solid reflective strips across the full width of the array between rows of scintillation pixels, placing a second plurality of solid reflective strips across the full length of the array between columns of scintillation pixels, filling spaces between pixels not occupied by solid reflective strips with a reflective fluid, and solidifying the reflective fluid to form the scintillation array.

In another aspect, a scanning instrument is provided, the scanning instrument being selected from positron emission tomography scanners, gamma cameras, computed tomography scanners, well logging detectors, thermal neutron activation analysis detectors, luggage scanners, thickness gauges, liquid level gauges, active or passive security and manifest verification devices, spectroscopy devices and gross counters, wherein the scanning instrument comprises a scintillation array comprising a plurality of scintillation pixels forming an array, the array having a depth, a high energy end and a light exit end, and a light reflective material positioned between at least some pairs of adjacent pixels along less than the full length of the adjacent pixels.

In another aspect a scanning instrument is provided, the scanning instrument selected from positron emission tomography scanners, gamma cameras, computed tomography scanners, well logging detectors, thermal neutron activation analysis detectors, luggage scanners, thickness gauges, liquid level gauges, active or passive security and manifest verification devices, spectroscopy devices and gross counters; the scanning instrument comprising a scintillation array comprising a matrix of scintillating pixels arranged in rows and columns, the matrix having a depth from a first end to a second end, a first series of reflective strips, the strips having a first height less than the depth of the matrix, the first series of strips separating the rows of the matrix, and a second series of reflective strips having a second height less than the depth of the matrix, the second series of strips separating the columns of the matrix.

BRIEF DESCRIPTION OF THE DRAWINGS

These and other features and advantages will be better understood by reading the following detailed description, taken together with the drawings wherein.

DETAILED DESCRIPTION

Figure 1:
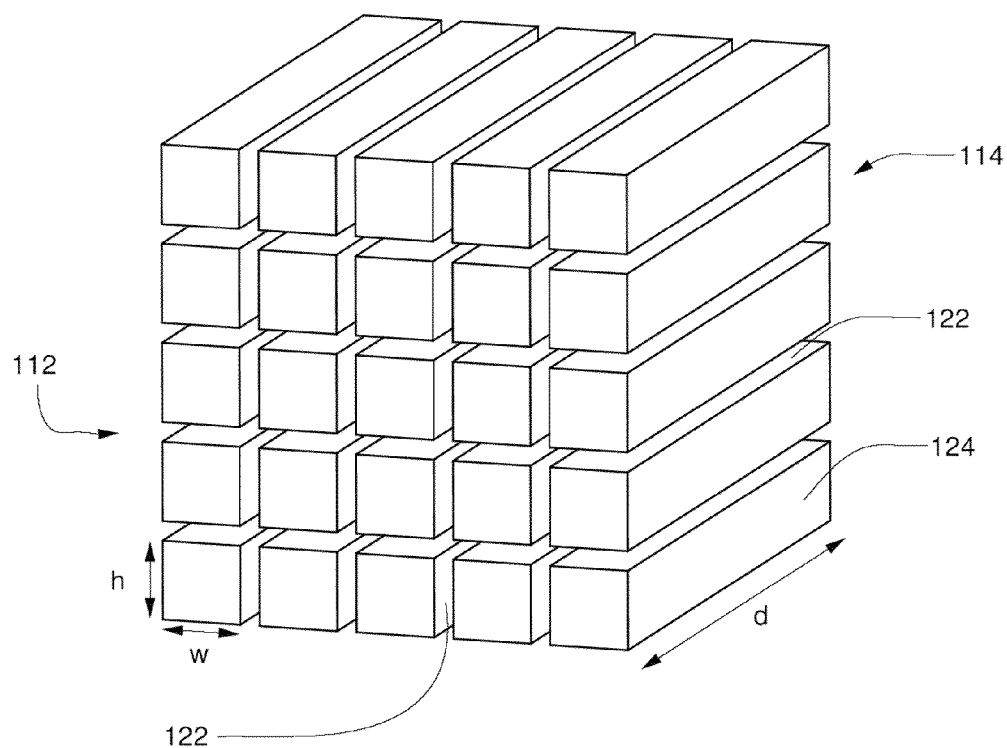
FIG. 1 provides a perspective schematic of a 5×5 scintillation array.

Scintillation detectors are generally used to detect relatively high energy photons, electrons or alpha particles wherein high energy is 1 KeV or higher, including gamma rays, α-particles and β-particles. It may be appreciated that these photons, electrons or alpha particles may not be easily detected by conventional photodetectors, which may, for example, be sensitive to photons at wavelengths of 200 nm or greater, including 200 nm to 800 nm. A scintillator, or scintillation crystal, ceramic or plastic, absorbs excitatory waves or particles and converts the energy of the waves or particles to a light pulse. The light may be converted to electrons (i.e., an electron current) with a photodetector such as a photodiode, charge coupled detector (CCD) or photomultiplier tube.

As used herein, the term "high energy surface" or "high energy end" denotes the surface of a scintillation array or pixel through which high energy photons, electrons or alpha particles first enter. "Detectable light" is the light output by a scintillator that can be detected by a photodetector. Detectable light has a wavelength in the range of 200 to 700 nm. A "photodetector" converts detectable light emitted from a scintillation crystal into an electrical signal. The term "optically coupled" refers to at least one coupled element being adapted to impart light to another coupled element directly or indirectly. The term "scintillator" refers to a material that emits light ("scintillation light") in response to high energy photons, electrons or alpha particles wherein high energy is 1 KeV or higher ("excitatory energy"). This excitatory energy includes gamma rays, α-particles and β-particles incident thereon. Known scintillators include materials such as ceramic, crystal and polymer scintillators. A "scintillation crystal" is a scintillator made primarily of inorganic crystal. "Scintillation pixels" are known to those of skill in the art and comprise individual scintillators that are each associated with one or more photodetectors. Multiple scintillation pixels can be associated together to form a "scintillation array." The array may be associated with one or more photodetectors. The detectable light from each pixel can be independently detected. The pixels may be separated from each other and may be joined via a common substrate. An "adhesive" as used herein is a material that can be used to join independent pixels together in an array or to preserve the spacing between pixels. A "diffuse" reflective material reflects a given ray of visible light in multiple directions. A "specular" reflective material reflects a given ray of visible light in a single direction. A material is "transparent" to visible light if it allows the passage of more than 50% of the visible light that impacts the material. A material is "opaque" if it blocks 80% or more of the visible light that impacts the material.

Scintillation detectors may be used in various industries and applications including medical (e.g., to produce images of internal organs), geophysical (e.g., to measure radioactivity of the earth), inspection (e.g., non-destructive, non-invasive testing), research (e.g., to measure the energy of photons and particles), and health physics (e.g., to monitor waves or particles in the environment as it affects humans). Medical devices may include positron emission tomography scanners, gamma cameras, computed tomography scanners and radio-immunoassay applications. Geophysical devices may include well logging detectors. Inspection devices may include radiance detectors, such as thermal neutron activation analysis detectors, luggage scanners, thickness gauges, liquid level gauges, security and manifest verification, both active and passive devices, spectroscopy devices (radioisotope identification devices), both active and passive devices, and gross counters, both active and passive. Research devices may include spectrometers and calorimeters. Health physics applications may include laundry monitoring and area monitoring.

In one aspect, a scintillation array includes a plurality of scintillation pixels that can be arranged in rows and columns. The pixels may be cuboid in shape and have a length, width and depth (x-ray depth). Although pixels may be of any dimension, in many embodiments the length and width are similar and the depth is greater than both the length and the width. The depth is measured along the axis of the pixel that is most aligned with the path of the excitatory energy when the array is installed in an imaging device. The spaces between adjacent pixels may be partially occupied by a reflective material designed to propagate the transmission of visible light out of the light exit end of the array. The space between adjacent pixels may contain light reflective material at the high energy end of the array and may contain nothing, or a transparent substance, at the light exiting end of the array. The absence of reflective material between pixels at the light exiting end of the array can allow light formed from scintillation events in this region to cross over to additional pixels before exiting the array. A unique detectable light pattern results. This light pattern can be detected by a photodetector and is indicative of the depth of interaction (DOI) at which the scintillation event occurs. This information can be used to reduce or eliminate parallax effects that occur when excitatory rays enter the array at an angle and pass through one or more pixels prior to creating the scintillation event.

In another aspect, a scintillation array is provided that includes strips of reflective material placed between rows and columns of pixels. The strips may be "half height" strips which means the strips extend through about half the depth of the array. A first set of strips of reflective material can be placed first between rows of pixels and then a second set of strips can be placed above the first set and between columns of pixels. The two sets of strips may be oriented at 90 degrees to each other. The use of solid half height strips can allow for faster production of scintillation arrays compared to the state of the art. Half height strips running between columns and rows can provide reflectance as well as proper alignment and positioning for the pixels. After the strips are in place, the remaining voids between pixels can be flooded with a reflective adhesive that can serve to secure the pixels in position as well as to provide reflectance.

Scintillation arrays often are composed of a group of scintillating pixels arranged in rows and columns to produce the array. Scintillation pixels may be inorganic or organic. Examples of inorganic scintillation pixels may include crystals such as thallium doped sodium iodide (NaI(Tl)) and thallium doped cesium iodide (CsI(Tl)). Additional examples of scintillation crystals may include barium fluoride, cerium-doped lanthanum chloride (LaCl$_3$(Ce)), bismuth germinate (Bi$_4$Ge$_3$O$_{12}$), cerium-doped yttrium aluminum garnet (Ce: YAG), cerium-doped lanthanum bromide (LaBr$_3$(Ce)), lutetium iodide (LuI$_3$), calcium tungstate (CaWO$_4$), cadmium tungstate (CdWO$_4$), lead tungstate (PbWO$_4$), zinc tungstate (ZnWO$_4$) and lutetium oxyorthosilicate (Lu$_2$SiO$_5$), as well as cerium doped-lutetium yttrium oxyorthosilicate (Lu$_{1.8}$Y$_{0.2}$SiO$_5$(Ce)) (LYSO). Scintillators may also include inorganic ceramics such as terbium-doped gadolinium oxysulfide (GOS(Tb)), and europium doped lutetium oxide (Lu$_2$O$_3$(Eu)). In addition, examples of organic scintillators may include polyvinyltoluene (PVT) with organic fluors present in the PVT as well as other polymer materials.

Arrays may include any number of scintillation pixels and pixels may be made of, for example, crystalline or polymeric material. As shown in FIG. 1, the depth (d) of pixel 124 may be greater than the width (w) and/or height (h) of pixel 124. The array can be placed in association with an imaging device so that high energy end 112 of the array is oriented toward the excitatory energy source. Light exiting end 114 can be associated with a photodetector so that light resulting from scintillation events can be detected. Each individual pixel may have one or a plurality of photodetectors associated with it. Space 122 between pixels may be occupied by a reflective, opaque material designed to channel light to light exiting end 114 of the array while minimizing crosstalk between pixels. In this manner, light generated within a specific pixel can be detected by a photodetector associated with that same pixel or by a portion of a photodetector associated with that pixel.

Figure 2A:
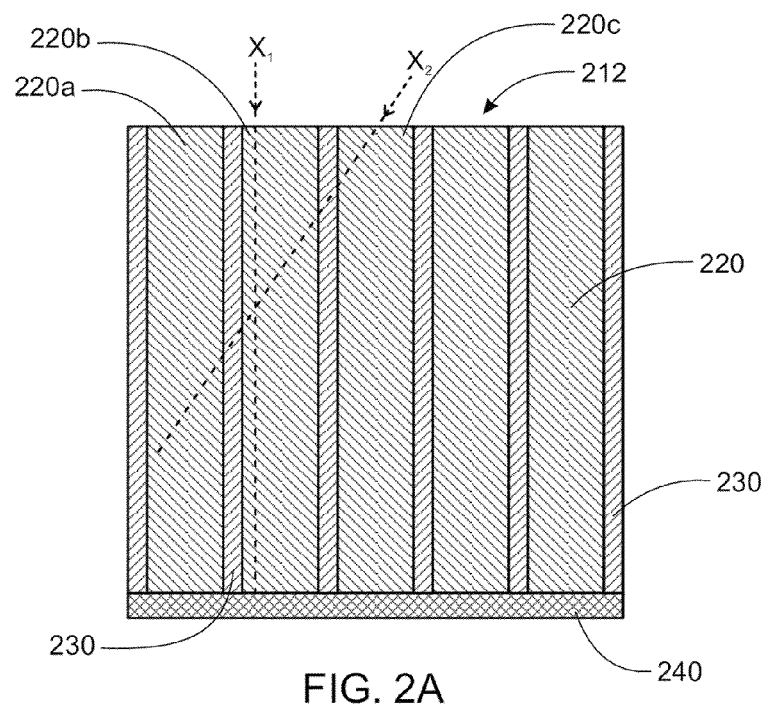
FIG. 2A provides a cross-sectional view of an embodiment of an array including reflective material along the full depth of the pixels.

FIG. 2A provides a cut away view of a scintillation array showing the positioning of five aligned pixels. In this example, each pixel measures 4×4×30 mm. As shown, high energy end 212 is at the top of the figure and light exit window 240 is at the bottom, although visible light may also exit from the high energy end. Pixels 220, 220a, 220b and 220c include reflective barrier 230 separating the adjacent pixels. If excitatory energy enters the scintillation array along a path that is parallel to the depth of the pixels ($x_1$) the resulting scintillation event will take place in pixel 220b, regardless of how deep within the pixel the event occurs. However, if the excitatory energy enters the array at an angle ($x_2$), the resulting scintillation event may occur in any of pixels 220c, 220b or 220a, depending on how far the excitatory energy penetrates the array before scintillating. If the resulting scintillation event occurs in either pixel 220b or 220a the resulting light will be detected as having occurred in 220b or 220a, rather than in pixel 220c, the first pixel penetrated by the excitatory energy. These parallax effects can cause distortion in the reconstructed image. If information can be obtained regarding the depth of interaction (DOI) of the x-ray or gamma ray then much, or all, of this distortion can be removed.

Figure 2B:
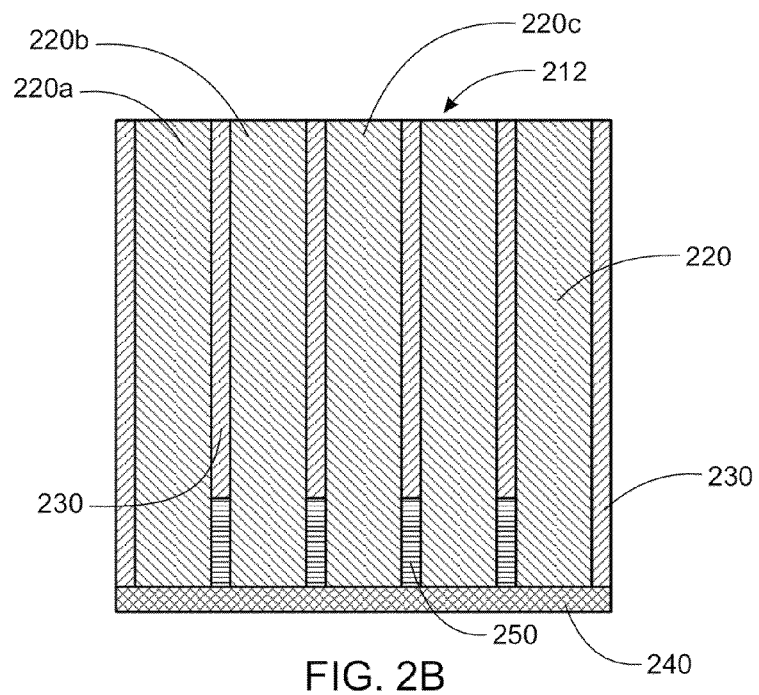
FIG. 2B provides a cross-sectional view of an embodiment of an array including transparent material along a portion of the depth of the pixels.

Information regarding the depth at which a scintillation event occurs can be deduced by how the resulting light spreads through the array after the event occurs. Although this light spread is typically too subtle and prone to stochastic fluctuations to be useful, it has been determined that if only a portion of a given pixel can be made to share light with neighboring pixels that the light will spread, based on the depth of the event, over a large enough area that information regarding the depth of interaction can be determined. A scintillation array with an absence of opaque material between portions of adjacent pixels is shown in FIG. 2b. While the space between pixels may be filled with an opaque, reflective material 230 for a portion of the array, at least one portion 250 can be filled with a material that is transparent to light. The reflective and/or opaque material may retain visible light in the pixel in which the scintillation event occurs rather than allowing the light to be transmitted to adjacent pixels and beyond. In this case, the light can be detected by a photo detector associated with the pixel in which the scintillation event occurred. In some embodiments the reflective and/or opaque material may retain, within the pixel, more than 50%, more than 76%, more than 80% or more than 90% of the visible light that impacts the material. Non-opaque (transparent) portion 250 can allow for the transmission of light from one pixel to an adjacent pixel (and beyond) before exiting through light window 240. It may allow, for example, greater than 40%, greater than 50%, greater than 53%, greater than 80% or greater than 90% of the visible light that forms in a pixel to pass through to an adjacent pixel. In FIG. 2b, about 5 mm of the channel 230 between adjacent pixels at the light emitting end is filled with a clear epoxy that allows for greater than 50% transmission of visible light. Thus, the visible light formed in the portion of the array that does not include opaque borders between pixels may be detected by a photodetector that is associated with a different pixel from the one in which the scintillation event occurred. As a result, light that is formed in this "transparent" portion appears to be formed partially in the pixel where the event did occur but also partially in one or more of its neighboring pixels. The resulting pattern of emitted light can provide DOI information that can result in a less distorted image. As shown in FIG. 2b the light emitting end is opposite the high energy end, although in other embodiments it can also be the same as the high energy end.

Leaving a transparent portion of space separating pixels may be contrary to conventional thought as it is believed that better scintillator light throughput can be obtained by maximizing the reflectivity along the length of the pixel. It has been found, however, that valuable information can be obtained by covering less than the entire depth of the pixel edges with a reflective and/or opaque material. In some embodiments the space may be left empty or may be filled with a transparent material such as glass, transparent epoxy or other non-opaque polymer. In one set of embodiments, the transparent space between pixels is at the light emitting end of the array. For example, the last 5%, 10%, 15% or 20% of the depth of the array may be transparent and/or void of reflective or opaque material. In some cases this may include, for example, a distance of about 20 mm, about 10 mm or about 5 mm from the light emitting end of the array where it contacts light exit window 240. There may be an equivalent amount of transparent space between each pair of adjacent pixels or, alternatively, the amount of transparent space between pixel pairs may vary. The thickness of the space between adjacent pixels may be, for example, greater than, equal to, or less than 20% of pixel width, 10% of pixel width or 5% of pixel width.

Figure 3A:
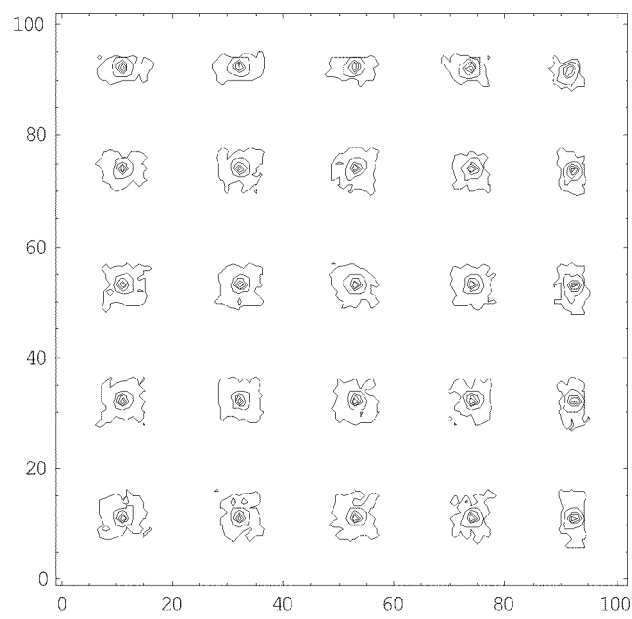
FIG. 3A provides an image illustrating a light pattern produced by the embodiment shown in FIG. 2A.
Figure 3B:
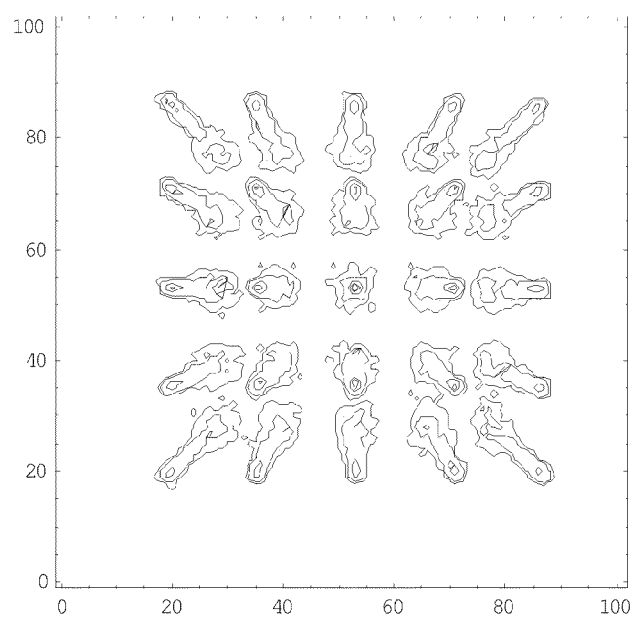
FIG. 3B provides an image illustrating a light pattern produced by the embodiment shown in FIG. 2B.

FIGS. 3a and 3b provide simulations of the light output of the arrays shown in FIGS. 2a and 2b, respectively. Data was generated using the DETECT 2000 system from TRIUMF Accelerator Lab, BC, Canada. In each of FIGS. 3A and 3B the contours are drawn at 0.2, 2, 20, 40 and 60% of the maximum count density. A comparison of the images shown in FIGS. 3a and 3b illustrates the effect of implementing a 5 mm transparent region between pixels, as shown in FIG. 2b. FIGS. 3a and 3b are simulations of the readout by a Hamamatsu H8500 position sensitive photomultiplier tube (PSPMT). The amount of light spread as the light exits a pixel can be seen in these images produced by Anger logic. Each of FIGS. 3a and 3b shows results for an array comprised of a 5×5 matrix of 4×4×30 mm crystal pixels. The image from the conventional array (3a) shows substantially circular "pinpoint" images, which is typically desired in scintillation systems. The image in FIG. 3b is from the array of FIG. 2b and shows a grouping of "comet like" readings exhibiting a head and tail that appears as if the comet is moving away from the center of the array.

Figure 4A:
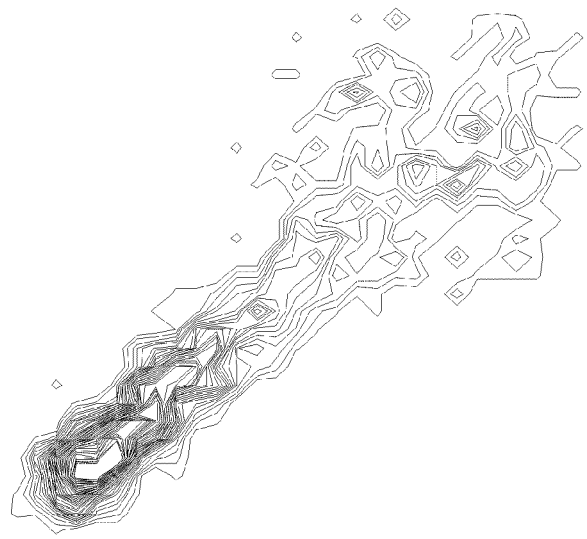
FIG. 4A provides an enlarged view of one of the light pixels shown in FIG. 3B.
Figure 4B:
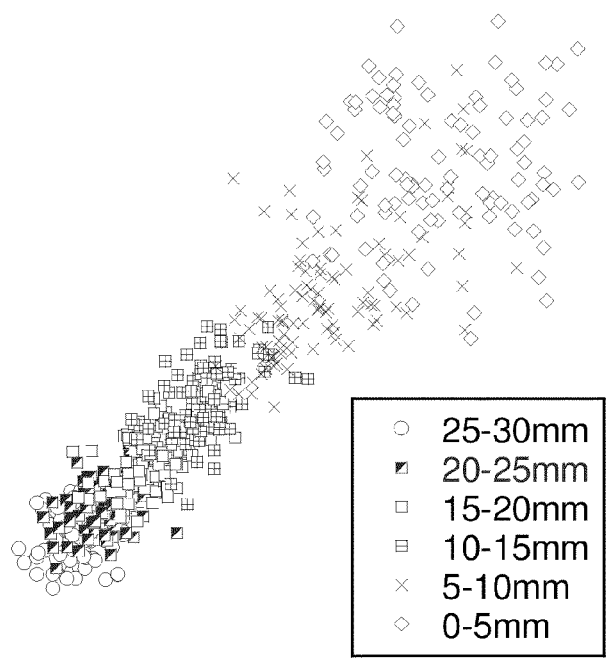
FIG. 4B provides a density plot of the image shown in FIG. 4A.

FIG. 4A provides an enlarged view of the lower left light image from FIG. 3b. Contours are provided at 2.5, 5, 7.5, 10.0, 12.5 . . . 75.0, 77.5 and 80% of maximum count density. The pattern of 1200 light points is distributed about a line having a major axis passing through the center of the array. The positioning of each of the light points along the axis of the distribution is a function of the depth in the scintillation pixel where the scintillation event took place. The closer the imaged point is to the center of the array, the closer the corresponding voxel is in depth to the light exiting window of the array. As shown in FIG. 4A, the light points in the northeast quadrant (closest to center of the array) are those that result from scintillation events closest to light emitting window 240. Those in the southwest quadrant are the light points that result from scintillation events closest to high energy end 212. FIG. 4B provides a density plot of the 1200 events shown in FIG. 4A. The scintillation array that generated the results shown in FIGS. 4A, 4B and 5 comprised 25 crystal pixels 30 mm in depth. The density plot of FIG. 4B shows groupings corresponding to distances of 0-5 mm, 5-10 mm, 10-15 mm, 15-20 mm, 20-25 mm and 25-30 mm from the light exit window. Thus, in this example the light pixels in the 0-5 mm range were formed in the portion of the array that includes transparent material, rather than opaque reflective material, between the pixels.

Figure 5:
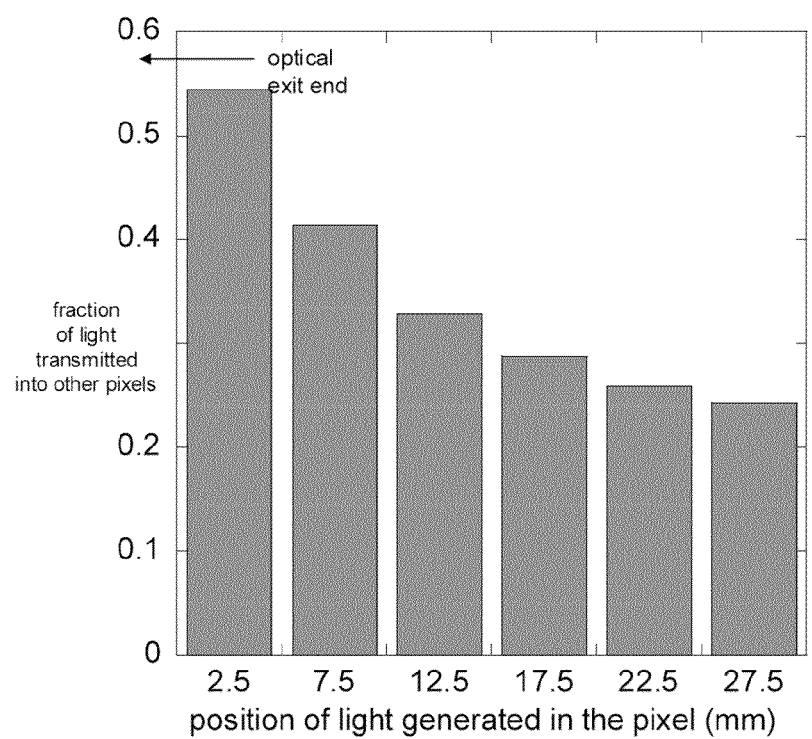
FIG. 5 (embodiment of FIG. 2B) is a bar graph showing the relationship between the depth at which a scintillation event occurs and the amount of the resulting light that is transmitted into pixels other than the one in which the event occurred.

FIG. 5 illustrates in graphical form the fraction of the light produced in a given pixel that appears to have been generated in a neighboring pixel. The data were obtained from a simulation using an array identical to that described in FIG. 2b utilizing a 5 mm transparent region at the optical exit end of the array. The six values along the x-axis provide the distance from the optical end at which a particular scintillation event occurs. As shown below in tabular form (Table 1) the fraction of the light that is transmitted to neighboring pixels increases as the scintillation event occurs closer to the optical exit end which, in this case, is also the end of the array that includes the transparent portion.

TABLE 1

| Distance from optical exit end (mm) at which scintillation event occurs. | Fraction of light transmitted to neighboring pixels. |
| --- | --- |
| 2.5 | 0.54 |
| 7.5 | 0.41 |
| 12.5 | 0.33 |
| 17.5 | 0.29 |
| 22.5 | 0.26 |
| 27.5 | 0.24 |

The information provided in the images shown in FIGS. 3, 4 and 5 can be used to improve the images generated by the scintillation array. For example, DOI data can be filtered and any parallax effect can be reduced or eliminated. In one set of embodiments an image can be produced using light formed in a specific region, such as within a specific depth, of the array. The region may be from a specific plane or planes that are normal to the depth dimension of the array. In one embodiment, results can be tailored so that only those scintillation events occurring in one half (e.g., the half closest to the high energy surface) of the array are used to provide results. Specific depths may be included, such as 0-5%, 0-10%, 0-20%, 0-50% or 0-75% of the depth as measured from the high energy surface or from the light emitting window. In specific arrays, the depth ranges by be, for example, up to 1 mm, up to 5 mm, up to 10 mm, up to 20 mm, up to 30 mm or up to 50 mm from the high energy end of the array. Specific ranges within the depth of the scintillation array may also be chosen. Results may be filtered to detect only voxels within a certain percentage of a distance from the position of a specific plane passing through the array. For example, the voxels within 10% of the distance a plane 20% from the high energy end may be sampled. These ranges of distance from a specific point in the array may be any percentage that can provide useful data including, for example, +/−5%, +/−10%, +/−20%, +/−30% or +/−40% of the distance from the high energy end or from the light emitting end of the array. In some arrays these distances may be +/−2 mm, +/−5 mm, +/−10 mm, +/−20 mm or +/−30 mm from either end. Scintillation events from different scintillation pixels may be manipulated equally or may be treated differently. For instance, scintillation pixels located around the periphery of the array may provide a greater light spread and may be subjected to greater data manipulation. Various methods may include irradiating an array with excitatory energy, detecting a pattern of resulting light emission, manipulating the pattern and determining the depth or a depth range in which the scintillation event occurred.

The transparent portion of space between scintillators can be filled with any appropriate material that allows for the transmission of visible light. This is in contrast to the opaque specular or diffuse material that can often be used between scintillators to promote reflection of light produced in the scintillators. The transparent material may be a solid, liquid or gas and may be, for example, a polymer, a crystal, a glass or a transparent fluid. In one set of embodiments, the transparent material is an epoxy polymer. The polymer may be applied to the pixels by bathing the light emitting end of the array in liquid epoxy and allowing the liquid to fill the gaps via capillary action. The length of desired fill can be controlled by, for example, the viscosity and surface tension of the fluid, by the exposure time, by the temperature and/or through the use of physical barriers to limit the flow of the liquid. After a desired length of material has been wicked into the interstitial space between scintillation pixels, the array can be withdrawn from the liquid to stop the flow. The material can be cured in position. In different embodiments, the opaque areas may be filled first or the transparent areas may be filled first.

In another aspect, a method of making a scintillation array can include the placement of solid strips of reflector material between rows and columns of pixels that form a scintillation array.

Solid reflector strips are frequently placed between individual adjacent pixels in a scintillation array. The reflector strips can help direct light to the light emitting end of the array and can also provide proper physical spacing between pixels. The strips typically include two sizes: large strips that have a length equal to the depth of the array and a width equal to the width (in either direction across the depth) of the array, and smaller strips that may have a length equal to the depth of the array but have a width that is approximately equivalent to the width of an individual pixel. Using these two sizes, a set of large strips can be used to separate rows of scintillation pixels and then the smaller strips can be inserted in the remaining interstitial space that separates the pixel columns. Thus, if the array is M pixels long and N pixels wide, the number of reflective strips used would be (N−1) large strips and ((M−1)×(N)) small strips. Thus, a 10×10 array would use 9 large strips and 90 smaller strips for a total count of 99 reflective strips placed in the array. As each strip is typically individually placed by hand, the placement of the strips requires extensive time and patience.

Figure 6:
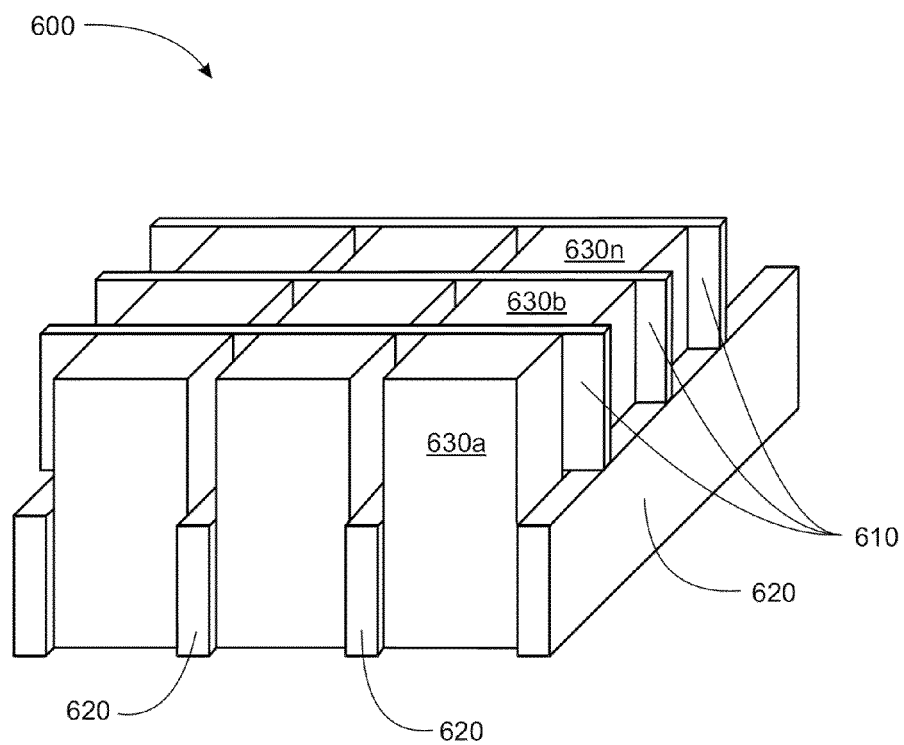
FIG. 6 provides a perspective diagram of one embodiment of a "criss-cross" scintillation array.

In one set of embodiments, multiple full length strips are placed between entire rows and entire columns of scintillation pixels. FIG. 6 shows a portion of scintillation array 600 with half height strips of reflective material placed between rows and columns of pixels. As shown in FIG. 6, reflective strips 610 and 620 can be placed between pixels 630a . . . 630n in rows and columns with strips 610 being placed between rows of scintillation pixels and strips 620 placed between columns of scintillation pixels. This results in a "criss-cross" design. The strips may be of reflective opaque material and may provide specular or diffuse reflectivity. The strips may be flexible and of a thickness that provides the desired spacing between scintillation pixels. Appropriate materials include polymers such as reflective polyester including, for example, DuPont 339 Polyester Reflector. Although the reflector strips 610 and 620 are both shown as "half-height" strips, the height of the strips can be varied, with one strip being of greater height than the other. The sum of the height of the two strips, whether equal or varied, may be about equal to the depth of the array.

Figure 7:
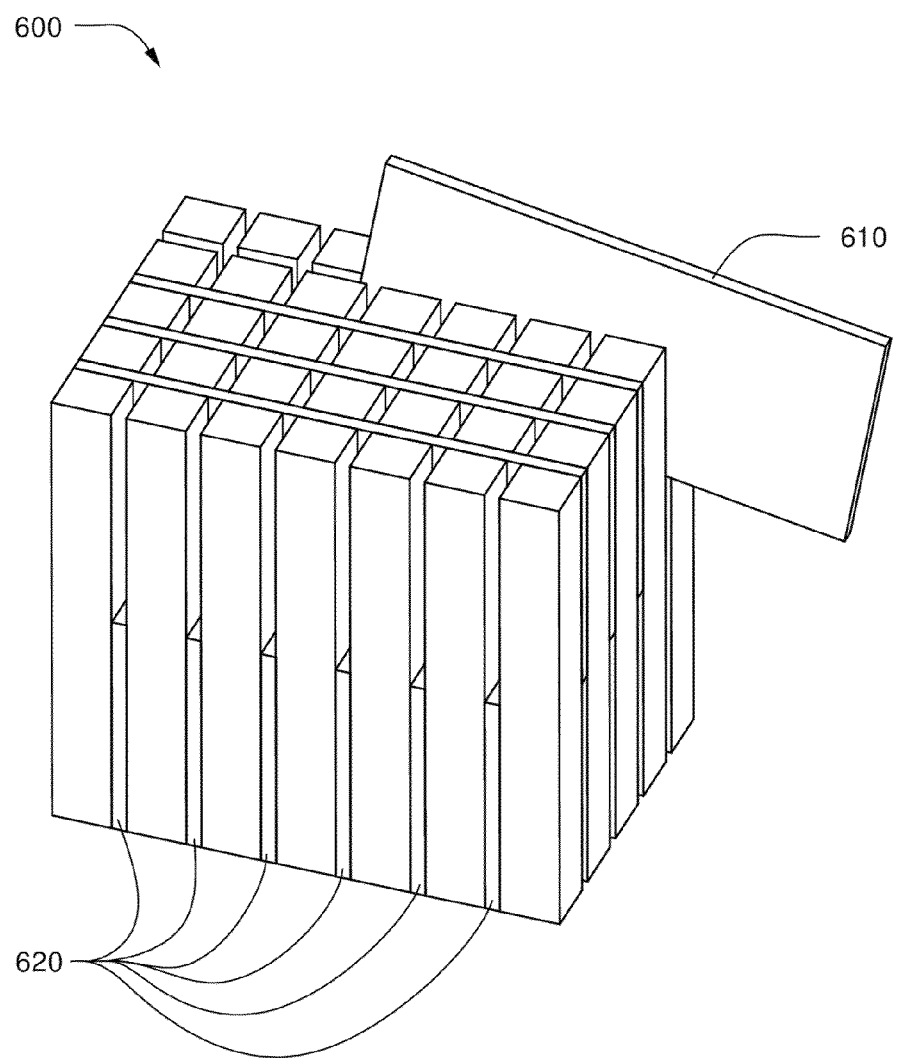
FIG. 7 shows a perspective view of one embodiment of a reflector strip being inserted into a scintillation array.

Strip 620 and those parallel to it may be inserted between columns of scintillating pixels prior to the insertion of strip 610 and the plurality of strips that are parallel to it. As shown in FIG. 7 the individual scintillation pixels may be aligned on a surface in an array with the x-ray depth axis aligned vertically. This may be completed prior to the insertion of any reflective strips. The pixels may be spaced adequately to allow for the insertion of the strips without disrupting the arrangement of the array. A parallel set of strips 620 may be inserted into the array and may be allowed to contact the surface that is supporting the scintillation pixels. After the first set of strips is inserted, the second set of strips 610, at ninety degrees to the first set, may be inserted in a second layer of the array. Thus, first strips 620 may form a layer covering about one half of the depth of the array while second strips 610 may form a second layer covering about one half of the depth of the array. As illustrated in FIG. 6, one layer of parallel reflective strips may be entirely above the other layer of reflective strips and the two layers may be placed along different planes with reference to the depth of the array. The strips may be inserted one at a time or a plurality at a time and may be inserted manually or by machine.

After two layers of solid strips have been inserted into the spaces between pixels, about half the surfaces of the pixels will be in contact with a reflective strip. This leaves about half the surface area of the pixels void of contact with a reflective strip. These voids may be left empty but may also be filled with a reflective material. In one set of embodiments, the void is filled with a flowable liquid that is subsequently cured into a solid that may optionally serve as an adhesive for retaining the pixels in the array. The liquid may be, for example, a reflective polymer such as BC-620 white paint. To promote penetration of the reflective liquid into the spaces between the pixels and between the reflective strips the array assembly may be subjected to a pressure differential. For example, the array may be placed on a vacuum chuck to help force the liquid into the voids. The array may be sealed around its periphery so that liquid poured into the top of the array (as oriented in FIG. 7) is forced through the openings between pixels by the vacuum force. The array may then be flipped upside down (180 degrees) and the process repeated. This procedure has been shown to substantially fill the voids with the liquid. The liquid may then be cured using methods known to those of skill in the art.

As arrays that incorporate reflective paint between scintillation pixels typically exhibit high levels of pixel to pixel crosstalk it was believed that the array described above might exhibit unacceptable crosstalk levels. It was also questionable whether or not the light output would be adequate. To determine the viability of this design, a test was designed where an array constructed using the method described above was compared to a similar array having no reflective strips and to another array employing 100% coverage with solid reflective strips.

The arrays tested and the results that were recorded are provided below in Table 2. All arrays were constructed with crystal pixels of LYSO ($Lu_{1.8}Y_{0.2}SiO_5$ (Ce)). Arrays 1-7 were each comprised of an 8×8 array of 4 mm×4 mm×29 mm pixels. Sample 8 was a 24×24 array of 4 mm×4 mm×29 mm pixels. Arrays 1-3 had no reflective material between pixels, allowing for cross talk within the array. Array one had no reflector material at all. Array 2 had a reflective strip of DuPont 339 polyester on the front and back surfaces of the array but no material on the sides. Array 3 had solid reflective strips around the perimeter of the array. Arrays 4-7 incorporated the "criss-cross" design described above. Each of the 8×8 arrays was constructed using half height strips of DuPont 339 polyester and each of arrays 4-7 was flooded with BC-670 to fill voids between pixels not occupied by solid strips of polyester. Array 4 included a layer of BC-620 paint around the perimeter which was in turn covered with DuPont 339 polyester strips. Array 6 was identical to array 5 except that the polyester strips were replaced with PTFE strips. Array 7 had reflector material removed from the perimeter of the array. Array 8 was a 24×24 pixel array with full reflective DuPont 339 polyester strips between each pixel and surrounding the array.

The light output (Pulse Height) from each of the arrays was measured and compared. Each of the arrays was tested using the following technique.

Each array was placed in the center of a 5 inch diameter photomultiplier tube (ADIT model B125B01). The voltage on the PMT was set to +1000 V. A $^{137}Cs$ gamma ray source emitting 662 KeV gamma rays was placed 5 inches above the center of the array to excite the scintillator pixels. The signal from the PMT was fed to a pre-amplifier/shaping-amplifier circuit and thence to a multi-channel analyzer (Aptek model S5008, bi-polar shaping, 1 μs shaping time, 11-bit digitization). The central channel position of the 662 KeV photopeak was recorded, termed "Pulse Height" with units given in channels. The full-width-at-half-maximum (FWHM) of this photopeak was also recorded, termed "Pulse Height Resolution" with units given in percentage of Pulse Height.

Arrays 1, 2 and 3 provide no pixel identification as there is no light separation between pixels. These arrays exhibit relatively high pulse heights but are typically not as useful as are the other arrays because they do not provide pixel identification. A comparison of either array 6 or 7 with array 8 shows a decrease in light output of (1−580/693)=0.16, or a 16% decrease in light output using the "criss cross" method of construction compared to an array using 100% reflective strips. This realized decrease in light output is significantly smaller than expected and is well within the requirements of many applications. Therefore these arrays can provide similar light output and results compared to arrays using full depth solid reflector strips. Cross talk is minimized and arrays may be substituted in most cases for arrays that employ reflective strips along the full depth of adjacent pixels.

TABLE 2

| Array | Design | Pixel Identification? | Pulse Height Resolution % | Pulse Height | pC |
|---|---|---|---|---|---|
| 1 | 8 × 8 LYSO with no reflector | No | 16.69 | 615 | 27.26 |
| 2 | 8 × 8 LYSO with reflective strip on back | No | 16.52 | 887 | 39.359 |
| 3 | 8 × 8 LYSO with reflective strip on back and sides | No | 14.05 | 789 | 35 |
| 4 | 8 × 8 LYSO with criss cross reflectors and BC-620 paint around outside covered by reflective strip | Yes | 17.68 | 548 | 24.28 |
| 5 | 8 × 8 LYSO with criss cross reflectors and BC-620 between pixels and reflective strip around outside | Yes | 14.61 | 558 | 24.72 |
| 6 | 8 × 8 LYSO with criss cross reflectors and BC-620 and PTFE material around outside | Yes | 16.95 | 580 | 25.70 |
| 7 | 8 × 8 LYSO with criss cross reflectors and BC-620 with reflector material removed from back and sides | Yes | 21.71 | 581 | 25.77 |
| 8 | 24 × 24 LYSO with full reflective strip between pixels and around the array | Yes |  | 693 |  |

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed.

All references, patents and patent applications and publications that are cited or referred to in this application are incorporated in their entirety herein by reference.

What is claimed is:

1. A scintillation array comprising:
   an array comprising a plurality of scintillation pixels, the array having a depth, a high energy end and a light exit end;
   a light reflective material positioned within a space between at least some pairs of adjacent pixels along less than the full depth of the adjacent pixels; and
   a solid transparent material adjacent to an end of the light reflective material.

2. The scintillation array of claim 1 wherein the light reflective material comprises an adhesive.

3. The scintillation array of claim 1 wherein the light reflective material comprises a reflective strip.

4. The scintillation array of claim 1 wherein the solid transparent material completely occupies the space between adjacent pixels along an entire height of the solid transparent material.

5. The scintillation array of claim 1 wherein at least 10% of the length of the scintillation array is void of light reflective material at the light exit end.

6. The scintillation array of claim 1 wherein a space between two adjacent pixels includes an opaque reflective portion and a transparent portion.

7. A device comprising the scintillation array of claim 1 and a photodetector.

8. A scanning instrument comprising the scintillation array of claim 1.

9. A method of detecting the position of a scintillation event comprising:
   irradiating an array of scintillation pixels with excitatory energy, the array comprising a first portion at a first end of the array and a second portion at a second end of the array;
   forming visible light within a first pixel as a result of a scintillation event;
   conducting at least 60% of the visible light formed in the first pixel within the first portion of the array to a photo detector associated with the first pixel; and
   transmitting at least 45% of the visible light formed in the first pixel within the second portion of the array to a photo detector that is not associated with the first pixel;
   detecting a light output pattern from the array;
   determining the position of the scintillation event by analyzing the light output pattern;
   analyzing an image of the light output pattern from a given scintillation pixel;
   determining the relative position of different light points within the pattern; and
   correlating the distance of a light point from the center of the image with the depth of interaction of the corresponding scintillation event.

10. The method of claim 9 where depth of interaction can be determined to within a voxel height equal to 20% or less of the pixel length array depth.

11. The method of claim 9 comprising using the depth of interaction information to correct parallax effects.

12. A scintillation array comprising:
a matrix of scintillating pixels arranged in rows and columns, the matrix having a depth from a first end to a second end;
a first series of reflective strips, the strips having a first height less than the depth of the matrix, the strips separating the rows of the matrix;
a second series of reflective strips having a second height less than the depth of the matrix, the strips separating the columns of the matrix; and
a transparent polymer adjacent to the first series of reflective strips within the rows and the second series of reflective strips within the columns.

13. The scintillation array of claim 12 comprising reflective paint in spaces between pixels not occupied by reflective strips.

14. The scintillation array of claim 12 wherein the second series of reflective strips is stacked on top of the first series of reflective strips.

15. A scintillation array comprising:
an array comprising a plurality of adjacent scintillation pixels, the array having a depth, a high energy end and a light exit end; and
a separator disposed between adjacent pixels, wherein the separator comprises first portion comprising a light reflective material and a second portion comprising a solid transparent material.

16. The scintillation array of claim 15, wherein the second portion of the separator is between the first portion of the separator and the light exit end of the array.

17. The scintillation array of claim 15, wherein the array is disposed on a window and wherein the second portion of the separator has an index of refraction greater than or equal to the index of refraction of the window.

18. The scintillation array of claim 15, wherein the second portion of the separator has an index of refraction of at least 1.5.

* * * * *